United States Patent
Konishi et al.

(10) Patent No.: US 8,266,236 B2
(45) Date of Patent: Sep. 11, 2012

(54) SCANNER SHARING DEVICE

(75) Inventors: Naoto Konishi, Kohaku (JP); Toshiki Nakajima, Kohaku (JP); Yutaka Koshinou, Kohaku (JP)

(73) Assignee: PFU Limited, Ishikawa (JP)

( * ) Notice: Subject to any disclaimer, the term of this patent is extended or adjusted under 35 U.S.C. 154(b) by 408 days.

(21) Appl. No.: 12/507,514

(22) Filed: Jul. 22, 2009

(65) Prior Publication Data
US 2010/0077089 A1 Mar. 25, 2010

(30) Foreign Application Priority Data
Sep. 19, 2008 (JP) ................ 2008-241540

(51) Int. Cl.
G06F 15/16 (2006.01)
(52) U.S. Cl. ......... 709/209; 709/208; 709/210; 709/218
(58) Field of Classification Search .................. 709/203, 709/218, 208, 209, 210
See application file for complete search history.

(56) References Cited

U.S. PATENT DOCUMENTS

| | | | | |
|---|---|---|---|---|
| 2007/0136293 | A1* | 6/2007 | Mizumukai | 707/9 |
| 2007/0263245 | A1* | 11/2007 | Carney et al. | 358/1.15 |
| 2007/0263252 | A1* | 11/2007 | Hara | 358/1.15 |
| 2008/0235303 | A1* | 9/2008 | Sensu et al. | 707/205 |
| 2008/0318618 | A1* | 12/2008 | Park | 455/550.1 |

FOREIGN PATENT DOCUMENTS

| | | |
|---|---|---|
| CN | 92233714.4 | 8/1993 |
| EP | 1 487 188 A1 | 12/2004 |
| GB | 2352540 | * 1/2001 |
| JP | 2003-195991 | 7/2003 |

OTHER PUBLICATIONS

Chinese Office Action issued Jan. 11, 2011 in corresponding Chinese Patent Application 200910167031.5.

* cited by examiner

*Primary Examiner* — Djenane Bayard
(74) *Attorney, Agent, or Firm* — Staas & Halsey LLP

(57) ABSTRACT

A scanner sharing device includes a scanner device connection terminal for a scanner device to be connected thereto, a plurality of computer connection terminals for a plurality of computers to be connected thereto, a connection switching unit selectively connecting one of the plurality of computer connection terminals with the scanner device connection terminal, and a switch control unit controlling the operations of the connection switching unit. When the scanner sharing device is in an automatic switching mode, the switch control unit maintains the connection between the computer connection terminal associated with that one computer and the scanner device connection terminal until the switch control unit receives a processing completion signal.

18 Claims, 5 Drawing Sheets

SCANNER SHARING DEVICE

BACKGROUND OF THE INVENTION

1. Field of the Invention

The present invention relates to a scanner sharing device for enabling a plurality of computers to share one scanner device.

2. Description of the Related Art

In an office or other such environment, there are cases where it is requested to have a plurality of personal computers to share a single peripheral device such as a printer or scanner device. In such a case, the method of connecting a plurality of personal computers with one server to thereby connect the peripheral device with the plurality of personal computers through the server, the method of connecting a network-supported printer etc. to a network made up of a plurality of personal computers, the method of connecting a plurality of personal computers and a peripheral device through a USB switch, etc. are being used. In particular, the method of using a USB switch is often used as it is inexpensive and is capable of easily realizing requests.

As a USB switch enabling a plurality of personal computers to share a peripheral device, there is for example a USB host switching device disclosed in Japanese Unexamined Patent Publication No. 2003-195991. This USB host switching device is provided with a USB device connector for a USB device to be connected thereto, a plurality of USB host connectors for personal computers and other USB hosts to be connected thereto, and a changeover switch for selecting any one connector from the plurality of USB host connectors and connecting the selected USB host connector with the USB device connector. The changeover switch is manually operated or the USB host connector connected to a powered up USB host is automatically detected so as to connect the USB host connector to which a powered up USB host is connected and the USB device connector. Note that, if there are plurality of powered up USB connectors, one USB host connector is selected according to a predetermined priority ranking.

Further, there is also an automatic USB switch capable of automatic switching even when a plurality of powered up personal computers are connected with the automatic USB switch. In such a USB switch, a USB controller monitors for the presence of a data signal between a personal computer connected with a USB device through the USB switch and the USB device. If there is no data signal transmitted for a constant period of time (for example, approximately 10 seconds), it judges that the connection with the USB device can be released. If there is a connection request from a different personal computer when the connection with the USB device can be released, it switches the connection so as to connect this personal computer with the USB device.

In the case where one printer is shared by a plurality of powered up personal computers, the data signal for one job is sent continuously from a personal computer to the printer. Therefore, the personal computer connected with the printer will not be switched during one job even if an automatic USB switch is used.

However, in the case of a scanner device, a certain amount of time is required from the time the command to start scanning is sent to until the scanner device starts scanning. During this period, a read data signal is not transmitted. Further, due to jam, document reload or other causes, the communication for the data signal is sometimes interrupted for a certain amount of time even during a job. In the case of a scanner device, in this way, there is the possibility that one job cannot be judged as being completed even if the communication for the data signal is interrupted for a certain amount of time in such a matter. As such, when using an automatic USB switch to enable a plurality of personal computers to share one scanner device, there are times when a connection request will be sent from a different personal computer in a state where no data signal is being transmitted and therefore the USB controller will judge that the present connection between the personal computer and the scanner device is releasable and release the connection with the scanner device to the different personal computer before the job is completed. As a result, there is the problem in that the operation of the USB switch will become unstable when switching again right after switching a connection, and the protection from switching during execution of a job will become unreliable.

SUMMARY OF THE INVENTION

Accordingly, an object of the present invention is to enable reliable and automatic switching of connections when having a plurality of computers share one scanner device.

In order to achieve the above object, according to the present invention, there is provided a scanner sharing device for enabling a plurality of computers to share one scanner device, which includes a scanner device connection terminal for a scanner device to be connected thereto and transmitting and receiving signals between the scanner device and the scanner sharing device, a plurality of computer connection terminals for a plurality of computers to be connected thereto and transmitting and receiving signals between the plurality of computers and the scanner sharing device, a connection switching unit selectively connecting one of the plurality of computer connection terminals with the scanner device connection terminal, and a switch control unit controlling the operations of the connection switching unit, wherein when the scanner sharing device is in an automatic switching mode, if the switch control unit receives processing request signals from the plurality of computers through the computer connection terminals, the switch control unit connects the computer connection terminal, associated with one computer emitting that processing request signal, with the scanner device connection terminal by the connection switching unit successively in the order in which the switch control unit received the processing request signals, and maintains the connection between the computer connection terminal associated with that one computer and the scanner device connection terminal until the switch control unit receives a processing completion signal from that one computer through the computer connection terminal.

In the above scanner sharing device, when the switch control unit connects the computer connection terminal associated with that one computer with the scanner device connection terminal in accordance with the processing request from one computer to begin scanning processing, it maintains the connection and does not release it to another computer until that one job (that is, one series of processing) is completed and the switch control unit receives a processing end signal from that one computer. Therefore, since the connection between one computer and the scanner device is reliably maintained until one job is completed, the connection with the scanner device will not be released to another computer during a job.

The scanner sharing device preferably further includes a mode changeover switch for switching between a manual switching mode which enables manual switching of the computer connection terminal to be connected with the scanner device connection terminal and an automatic switching mode, and at least one computer selection button for manually selecting one computer connection terminal to be connected with the scanner device connection terminal from the plurality of computer connection terminals when the scanner sharing device is in the manual switching mode.

Further, the scanner sharing device preferably further includes a mode display unit indicating whether the automatic switching mode or the manual switching mode is selected.

In the above scanner sharing device, preferably the mode changeover switch is a slide cover movable between a first position for selecting the automatic switching mode and a second position for selecting the manual switching mode, the slide cover covering the at least one computer selection button when the slide cover is moved to the first position and exposing the computer selection button outside the slide cover when the slide cover is moved to the second position.

Preferably, the at least one computer selection button comprises a plurality of computer selection buttons associated with the plurality of computers, respectively, the plurality of computer selection buttons configured so that one of the plurality of computer selection buttons light up when that one is selected.

The scanner sharing device may be built in the scanner device.

According to the scanner sharing device of the present invention, the connection between one computer and the scanner device is reliably maintained until one job (that is, one series of processing) is completed and the connection with the scanner device is not released to another computer during a job. Therefore, unlike the case where simply the presence of communication between a computer and a scanner device is monitored, the connection is not released even when connection with the scanner device is requested by another computer immediately after one job has started or when a jam etc. has occurred during a job, and the connection is switched reliably and automatically so that the requested job is completed.

BRIEF DESCRIPTION OF THE DRAWINGS

These and other objects, features, and advantages of the present invention will be described in more detail below based on preferred embodiments of the present invention with reference to the attached drawings, in which.

DESCRIPTION OF THE PREFERRED EMBODIMENTS

Preferred embodiments of a scanner sharing device according to the present invention will be described below with reference to the accompanying drawings.

Figure 1:
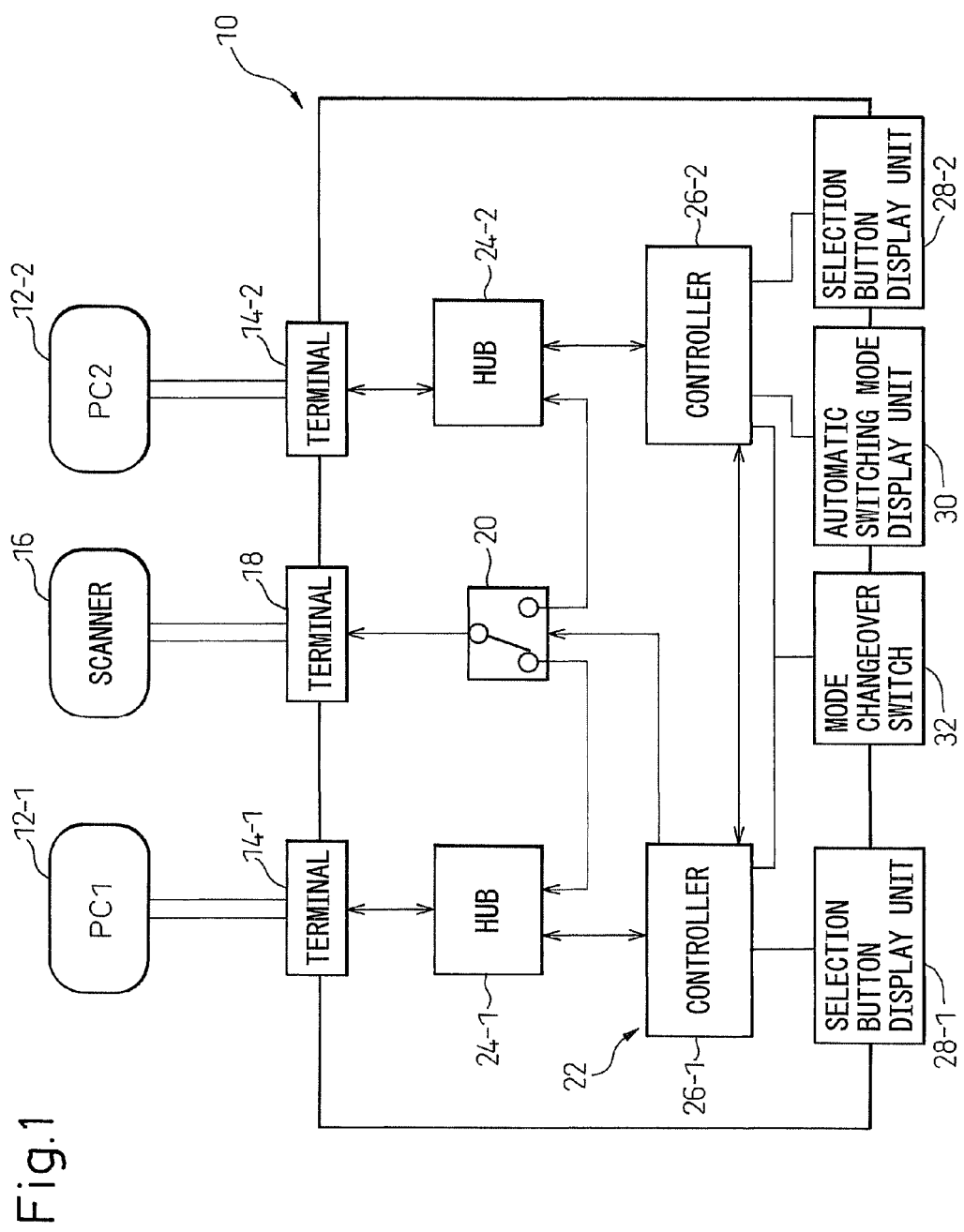
FIG. 1 is a functional block diagram showing the basic configuration of a scanner sharing device according to the present invention.

First, referring to FIGS. 1 to 4, the basic configuration of a scanner sharing device according to the present invention will be described. Referring to FIG. 1, a scanner sharing device 10 includes a main body 11, a plurality of computer connection terminals 14-1 and 14-2 respectively for a plurality of computers 12-1 and 12-2 to be connected thereto, a scanner device connection terminal 18 for scanner device 16 to be connected thereto, a connection switching unit 20 for switching computer connection terminals 14-1 and 14-2 to be connected with scanner device connection terminal 18 and selectively connecting one of terminals 14-1 and 14-2 with scanner device connection terminal 18, and a switch control unit 22 for controlling the operation of connection switching unit 20, and enables the plurality of computers 12-1 and 12-2 to share one scanner device 16. In the embodiment shown in FIGS. 1 to 4, two computers 12-1 and 12-2 share one scanner device 16. However, if increasing the number of computer connection terminals 14-1 and 14-2 provided in scanner sharing device 10, it is possible for three or more computers to share one scanner device 16.

The plurality of computer connection terminals 14-1 and 14-2 and scanner device connection terminal 18 may be arranged at any position on main body 11. In the embodiment shown in FIG. 1 to FIG. 4, as shown in FIG. 4, they are arranged on the back surface of main body 11 of scanner sharing device 10. Further, computer connection terminals 14-1 and 14-2 and scanner device connection terminal 18, as shown in FIG. 4, may be USB terminals for USB cables to be connected thereto. However, computer connection terminals 14-1 and 14-2 and scanner device connection terminal 18 need only be connection terminals which enable connection between computers 12-1 and 12-2 and scanner sharing device 10 or between scanner device 16 and scanner sharing device 10 so as to enable communication of signals. For example, computer connection terminals 14-1 and 14-2 and scanner device connection terminal 18 may also be connection terminals enabling connection of SCSI cables and other special cables or connection terminals enabling wireless communication between computers 12-1 and 12-2 and scanner device 16.

Connection switching unit 20 need only be one capable of selectively connecting, in accordance with an instruction from switch control unit 22, one contact with any one of a plurality of contacts arranged in parallel separately from the former contact. It may be for example a switch IC or a mechanical automatic changeover switch or the like. In connection switching unit 20, the contact at one side is connected with a line extending from scanner device connection terminal 18, while the contacts at the other side are connected with the lines extending from computer connection terminals 14-1 and 14-2 through hubs 24-1 and 24-2 in a parallel array. It switches the connection in accordance with an instruction from switch control unit 22 to selectively connect the line extending from scanner device connection terminal 18 with one of the lines extending from the plurality of computer connection terminals 14-1 and 14-2.

Switch control unit 22 controls the operation of connection switching unit 20. It has an automatic switching mode in which the operation of connection switching unit 20 is automatically controlled to switch the connection between scanner device connection terminal 18 associated with scanner device 16 and computer connection terminals 14-1 and 14-2 associated with computers 12-1 and 12-2, and a manual switching mode in which the operation of connection switching unit 20 is manually controlled to switch the connection between scanner device connection terminal 18 associated with scanner device 16 and computer connection terminals 14-1 and 14-2 associated with computers 12-1 and 12-2. When control unit 22 is in the automatic switching mode, it confirms whether or not it has received from computer 12-1 or 12-2 associated with computer connection terminal 14-1 or 14-2 connected with scanner device connection terminal 18 (specifically, the line extending between scanner device connection terminal 18 and connection switching unit 20) through connection switching unit 20 the processing completion signal for the job, that is, the series of processing, being performed using scanner device 16 and, when receiving the processing completion signal, judges that it may release the connection with scanner device connection terminal 18 to the other computer connection terminal 14-2 or 14-1. Note that, the "job" using scanner device 16 in the present application refers to the series of processing that should be performed from the time computer 12-1 or 12-2 sends a processing start instruction to the time it sends the processing completion signal.

Further, when switch control unit 22 receives processing requests for jobs or series of processing using scanner device 16 from computers 12-1 and 12-2, it confirms whether or not scanner device connection terminal 18 associated with scanner device 16 is releasable and, if releasable, controls the operation of connection switching unit 20 to connect computer connection terminal 14-1 or 14-2 associated with computer 12-1 or 12-2 (specifically, the line extending to connection switching unit 20 from computer connection terminal 14-1 or 14-2 associated with computer 12-1 or 12-2) with scanner device connection terminal 18 (specifically, the line extending to connection switching unit 20 from scanner device connection terminal 18). Further, when switch control unit 22 receives, from the plurality of computers 12-1 and 12-2, processing request signals for reserving jobs or series of processing, it connects computer connection terminal 14-1 or 14-2, associated with computer 12-1 or 12-2 that emitted the first processing request signal, with scanner device connection terminal 18 to execute the job or series of processing, waits until the connection with scanner device connection terminal 18 becomes releasable, and then controls the operation of connection switching unit 20 to connect the other computer connection terminal 14-2 or 14-1 with scanner device connection terminal 18 according to the order in which it received the processing request signals for reservation of processing requests.

That is, once switch control unit 22 in the automatic switching mode receives a request for processing using scanner device 16 from one computer 12-1 or 12-2, connects the line extending from computer connection terminal 14-1 or 14-2 associated with computer 12-1 or 12-2 with the line extending from scanner device connection terminal 18 associated with scanner device 16, and begins the job or series of processing using scanner device 16, it maintains the connection until it receives a processing completion signal from computer 12-1 or 12-2 and does not allow switching of connection with the line extending from the other computer connection terminal 14-2 or 14-1. Accordingly, while one job or series of processing is being performed, even if communication between scanner device 16 and computer 12-1 or 12-2 is interrupted, as long as the job or processing is not completed, the connection with scanner device 16 is not allowed to be switched and connected with the other computer 12-2 or 12-1. The switching of the connection is reliably and automatically performed so that the requested job or series of processing is completed.

In the illustrated embodiment, switch control unit 22 is configured of a plurality of controllers 26-1 and 26-2 connected through hubs 24-1 and 24-2 with computer connection terminals 14-1 and 14-2. One of controllers 26-1 and 26-2 is assigned to a main controller 26-1, and the other is assigned to a sub controller 26-2. Further, controllers 26-1 and 26-2 receive processing request signals and processing completion signals from computers 12-1 and 12-2 through associated computer connection terminals 14-1 and 14-2. Sub controller 26-2 communicates with main controller 26-1 and transmits information to main controller 26-1. In the end, main controller 26-1 controls the operations of connection switching unit 20 based on the transferred information. That is, main controller 26-1 collects and receives processing request signals and processing completion signals from computers 12-1 and 12-2 through computer connection terminals 14-1 and 14-2, hubs 24-1 and 24-2, and sub controller 26-2. Once it receives a processing request signal for a job or a series of processing using scanner device 16 from one computer 12-1 or 12-2 and judges that the line to scanner device connection terminal 18 is releasable, it controls the operation of connection switching unit 20 to connect computer connection terminal 14-2 or 14-1 associated with the other computer 12-2 or 12-1 with scanner device connection terminal 18 in accordance with the order in which it received the processing request signals.

If adopting such a configuration of switch control unit 22, when it is necessary to increase the computer connection terminals to enable three or more computers to share one scanner device 16, this can easily be dealt with by providing additional computer connection terminals and hubs and sub controllers corresponding to them and simply connecting the provided sub controllers to main controller 26-1.

In order to manually switch computer connection terminals 14-1 and 14-2 connected with scanner device connection terminal 18 when switch control unit 22 is in the manual switching mode, scanner sharing device 10 further includes at least one computer selection button. When switch control unit 22 is in the manual switching mode, if one computer is selected by a computer selection button, switch control unit 22 controls the operation of connection switching unit 20 to forcefully connect computer connection terminal 14-1 or 14-2 associated with selected computer 12-1 or 12-2 with scanner device connection terminal 18.

As shown in FIG. 1, a plurality of computer selection buttons 28-1 and 28-2 configured so that pushing computer selection buttons 28-1 and 28-2 selects the computers associated with computer selection buttons 28-1 and 28-2 may be provided as the computer selection button, or a single computer selection button configured so that the number of times the computer selection button is pushed switches the computers may be provided as the computer selection button. In the former, it is preferable for computer selection buttons 28-1 and 28-2 to have built-in display lights such as LEDs or lamps and for computer selection buttons 28-1 and 28-2 corresponding to selected computers 12-1 and 12-2 to light up so that it is visually easy to recognize computer 12-1 or 12-2 that is selected. On the other hand, in the latter, it is preferable for a plurality of display lights (for example, LEDs and lamps (not shown)) associated with computers 12-1 and 12-2 to be provided on scanner sharing device 10 and for the display light associated with selected computer 12-1 or 12-2 to light up so that it is visually easy to recognize computer 12-1 or 12-2 that is selected.

Further, scanner sharing device 10 further includes a mode changeover switch for switching between the automatic switching mode and the manual switching mode and with a mode display unit for indicating whether the automatic switching mode or the manual switching mode is selected.

Figure 2:
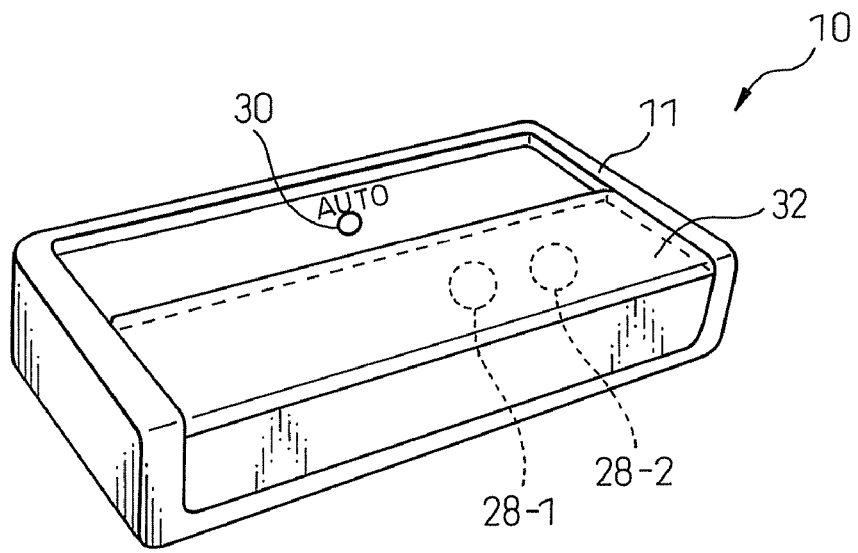
FIG. 2 is a perspective view showing the scanner sharing device in a state in which a slide cover is moved so that the device is in a automatic switching mode.
Figure 3:
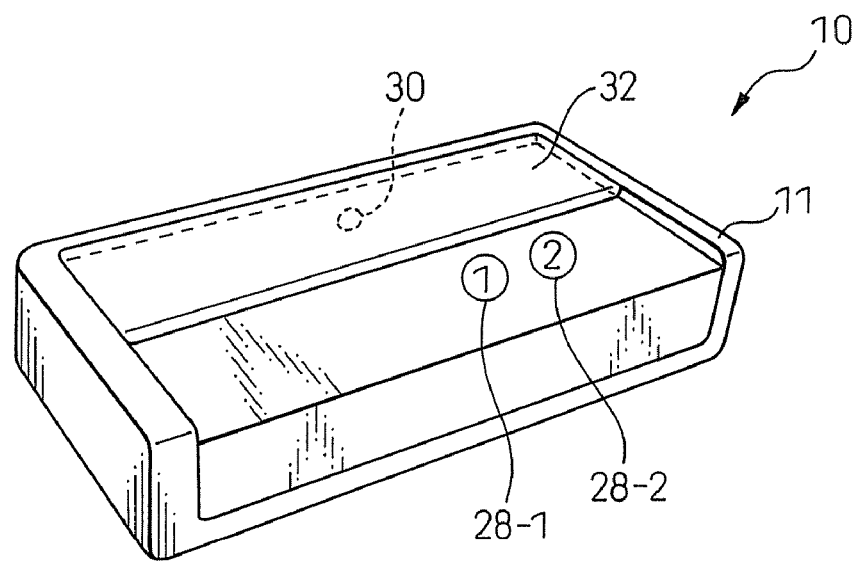
FIG. 3 is a perspective view showing the scanner sharing device in a state in which the slide cover is moved so that the device is in a manual switching mode.
Figure 4:
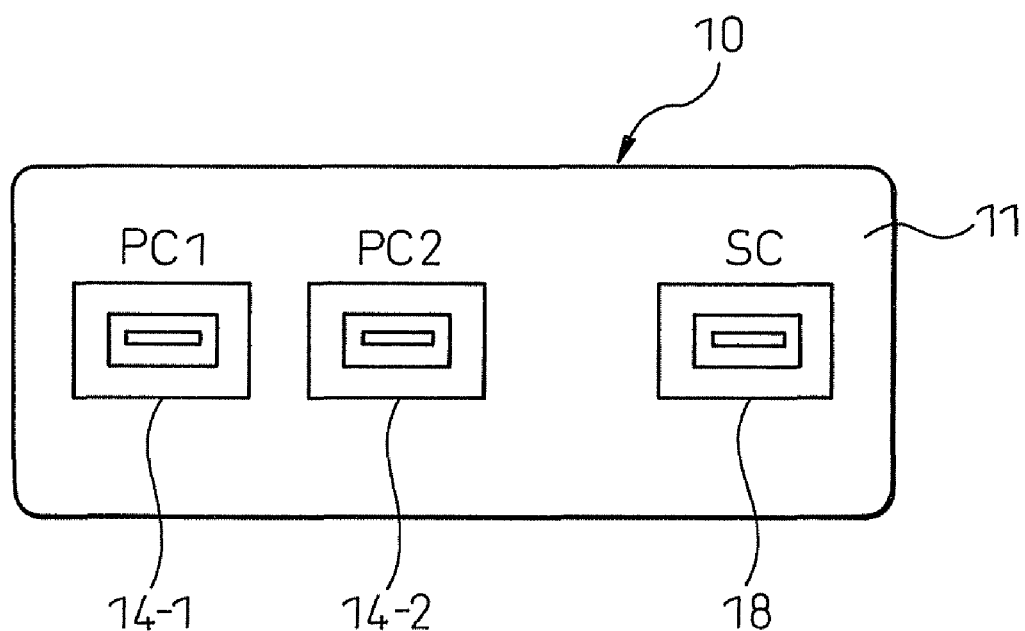
FIG. 4 is a back view of the scanner sharing device shown in FIGS. 2 and 3.

In the embodiment shown in FIGS. 1 to 4, a plurality of computer selection buttons 28-1 and 28-2 associated with computers 12-1 and 12-2 are provided at the front side of the top surface of main body 11 of scanner sharing device 10, while an automatic switching mode display light 30 such as an LED or lamp lighting up when the automatic switching mode is selected is provided at the back side of the top surface of main body 11 of scanner sharing device 10. The mode display unit is configured by automatic switching mode display light 30 and computer selection buttons 28-1 and 23-2 with built-in display lights. Further, the mode changeover switch is configured by a slide cover 32 provided on the top surface of main body 11 so as to be slidable between a first position for selecting the automatic switching mode and a second position for selecting the manual switching mode. When slide cover 32 is moved to the first position as shown in FIG. 2, the switch control unit is switched to the automatic switching mode and slide cover 32 covers computer selection buttons 28 used for selecting the manual switching mode. On the other hand, when slide cover 32 is moved to the second position as shown in FIG. 3, computer selection buttons 28-1 and 28-2 are exposed outside slide cover 32. Slide cover 32 is preferably made from a transparent material so as to allow computer selection buttons 28-1 and 28-2 and automatic switching mode display light 30 to be visible even when they are covered by slide cover 32.

If the mode changeover switch is configured by slide cover 32 in this way, when switched to the manual switching mode, computer selection buttons 28-1 and 28-2 are exposed outside slide cover 32 allowing the use of computer selection buttons 28-1 and 28-2, while when switched to the automatic switching mode, computer selection buttons 28-1 and 28-2 which are not used in the automatic switching mode are covered by slide cover 32 and unable to be used, thus enabling mistaken operation by users to be prevented.

However, the mode changeover switch need only be one capable of switching between the automatic switching mode and the manual switching mode and may be a general changeover switch or pushbutton switch etc. Further, the display unit indicating the selection of the manual switching mode may also be a display light such as an LED or lamp provided on main body 11 independently of computer selection buttons 28-1 and 28-2.

Figure 5:
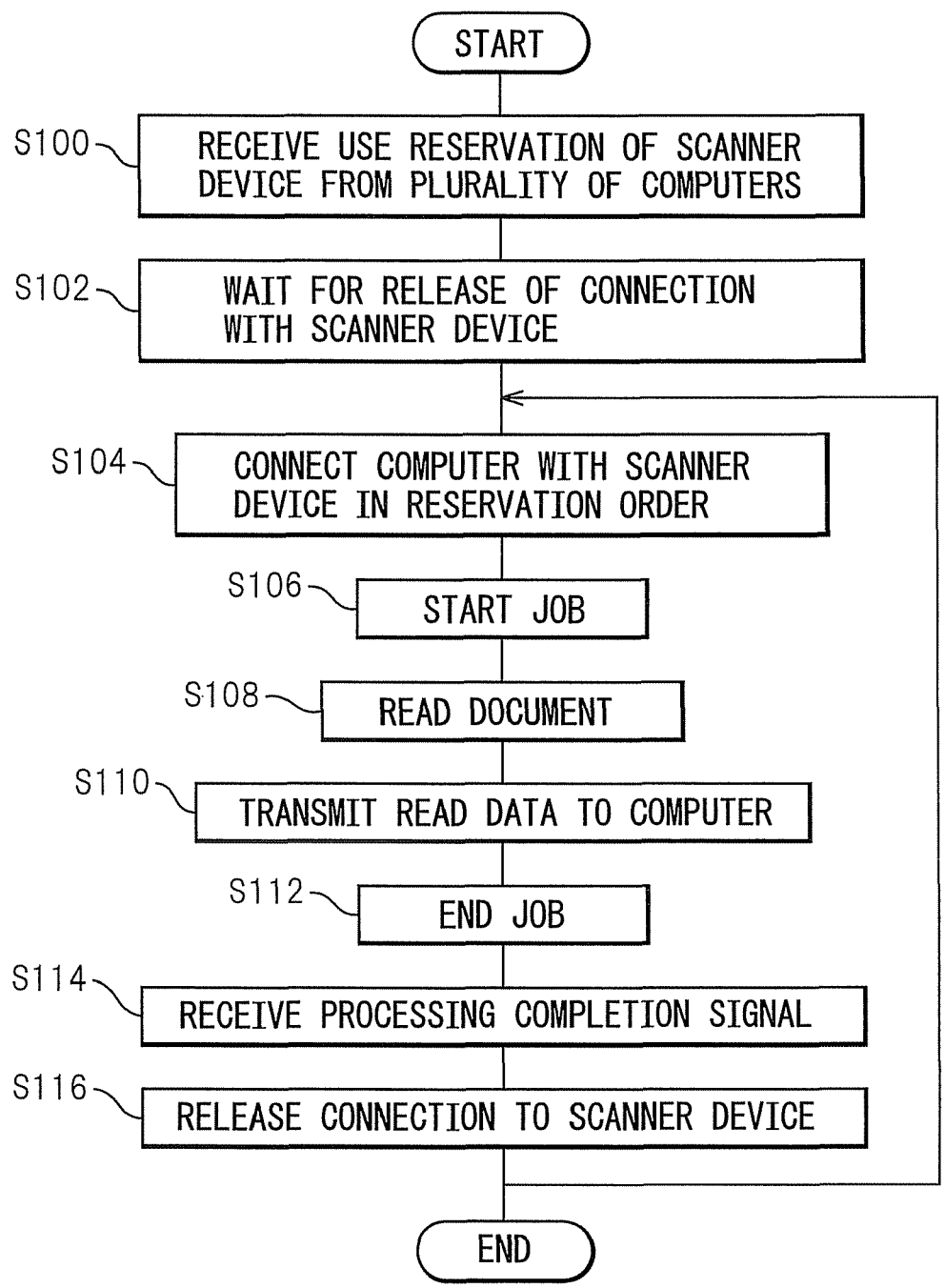
FIG. 5 is a flowchart showing the operation of the scanner sharing device according to the present invention when it is in the automatic switching mode.

Next, referring to FIG. 5, the operation of scanner sharing device 10 according to the present invention will be described.

First, the operation of scanner sharing device 10 when it is in the automatic switching mode will be described. In order to put scanner sharing device 10 in the automatic switching mode, the switching mode is switched by the mode changeover switch to the automatic switching mode. In the embodiment shown in FIGS. 1 to 4, by moving slide cover 32 on the top surface of scanner sharing device 10 forward until the first position shown in FIG. 2, the mode is switched to the automatic switching mode, and automatic switching mode display unit 30 on the top surface of scanner sharing device 10 is caused to light up to indicate that the automatic switching mode is entered. In this state, computer selection buttons 28-1 and 28-2 are covered by slide cover 32, thereby preventing an operator from accidentally pressing computer selection buttons 28-1 and 28-2.

When the plurality of computers 12-1 and 12-2 connected with scanner sharing device 10 performs a job or a series of processing using scanner device 16, the application for operating scanner device 16 is started up and the start of the scan is instructed from the application, whereby, by the function of the application, computers 12-1 and 12-2 automatically send processing request signals for reservations of jobs or series of processing to scanner device 10. When scanner sharing device 10 receives reservations of processing requests using scanner device 16 from the plurality of computers 12-1 and 12-2 connected with the plurality of computer connection terminals 14-1 and 14-2 of scanner sharing device 10 (step S100), it confirms whether or not the connection between connection switching unit 20 and scanner device connection terminal 18 (specifically, the line extending between scanner device connection terminal 18 connected with scanner device 16 and connection switching unit 20) is releasable and, if not releasable, waits until it receives a processing completion signal from computer 12-1 or 12-2 currently using scanner device 16 and for the connection to become releasable, as mentioned later (step S102). When the connection with scanner device connection terminal 18 becomes releasable, switch control unit 22 controls the operation of connection switching unit 20 to switch the connection and then, in accordance with the order of reservations of the jobs or series of processing received (that is, the order in which processing request signals are received), connects computer connection terminal 14-1 or 14-2, associated with computer 12-1 or 12-2 that emitted the processing request signal (specifically, the line extending between computer connection terminal 14-1 or 14-2 associated with computer 12-1 or 12-2 and connection switching unit 20), with scanner device connection terminal 18 (step S104). This begins the job or series of processing (step S106).

When the job or series of processing is begun, scanner device 16 reads documents (step S108). The read data is sent from scanner device 16 through scanner device connection terminal 18, connection switching unit 20, and computer connection terminal 14-1 or 14-2, to computer 12-1 or 12-2 (step S110). At this time, because switch control unit 22 maintains the connection between computer connection terminal 14-1 or 14-2 associated with computer 12-1 or 12-2 and scanner device connection terminal 18 until it receives the processing completion signal from computer 12-1 or 12-2 that emitted the processing request signal for processing the job or the series of processing, even if a state in which no read data is communicated continues at the beginning of the processing and the job or even if the communication of the read data and the like is interrupted during the processing or the job, the connection with scanner device connection terminal 18 will not be released to computer connection terminal 14-2 or 14-1 associated with the other computer 12-2 or 12-1. Accordingly, switching of the connection is reliably and automatically performed in a way in which the requested job or series or processing is completed.

Once the job or series of processing ends (step S112) and an application run in computer 12-1 or 12-2 judges that the job or series of processing has been completed, a processing completion signal is sent to switch control unit 22 by the functions of the application. When switch control unit 22 receives the processing completion signal (step S114), it judges that the connection with scanner device connection terminal 18 has become releasable and releases the connection with scanner device connection terminal 18 (step S116). Next, when there is a reservation of a processing request from the other computer 12-2 or 12-1, switch control unit 22 returns to step S104, where it controls the operation of connection switching unit 20 to switch the connection and, in accordance with the order of reservation of processing requests, connects computer connection terminal 14-2 or 14-1 associated with the other computer 12-2 or 12-1 with scanner device connection terminal 18.

On the other hand, in order to put scanner sharing device 10 in the manual switching mode, the switching mode is switched by the mode changeover switch to the manual switching mode. In the embodiment shown in FIGS. 1 to 4, by moving slide cover 32 on the top surface of scanner sharing device 10 backward until the second position shown in FIG. 3, the switch mode is switched to the manual switching mode. In this state, computer selection buttons 28-1 and 28-2 are exposed outside slide cover 32 and operation of computer selection buttons 28-1 and 28-2 becomes possible. Further, the computer selection buttons are used to manually select which computer of the plurality of computers 12-1 and 12-2 is connected with scanner device 16. For example, as in the embodiment shown in FIGS. 1 to 4, when a plurality of computer selection buttons 28-1 and 28-2 associated with the plurality of computers 12-1 and 12-2 are provided, pushing one of the plurality of computer selection buttons 28-1 and 28-2 manually determines which computer of the plurality of computers 12-1 and 12-2 is connected with scanner device 16. Switch control unit 22 then controls the operations of connection switching unit 20 to connect computer connection terminal 14-1 or 14-2, associated with computer 12-1 or 12-2 associated with the pressed computer selection button 28-1 or 28-2, with scanner device connection terminal 18 according to what was determined.

By providing a manual switching mode in this way, application for transmitting read data to a specific computer 12-1 or 12-2 by the operation of the scan button on scanner device 16 becomes possible.

Figure 6:
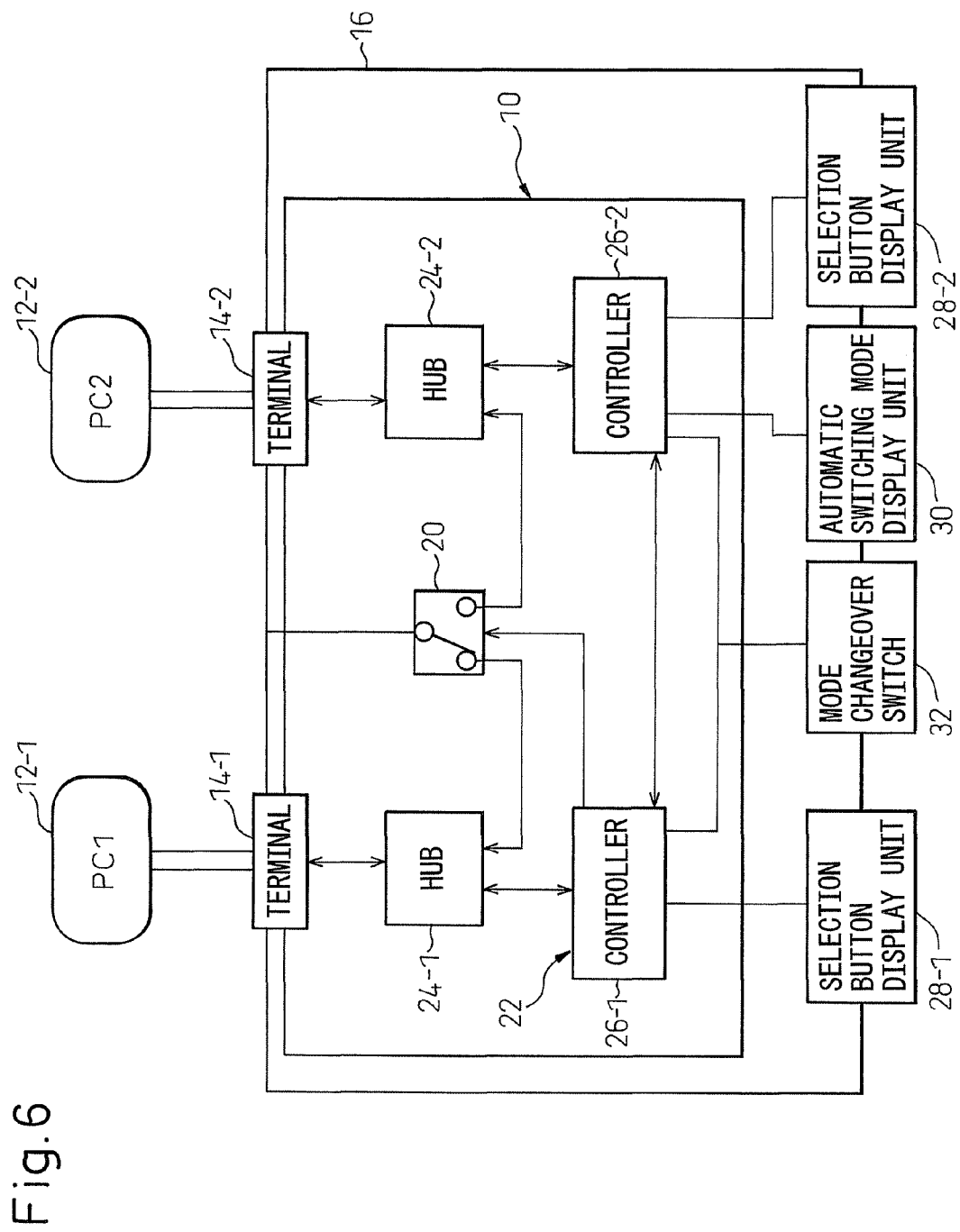
FIG. 6 is a functional block view showing the overall configuration of a scanner device housing a scanner sharing device according to the present invention.

In the embodiment shown in FIGS. 1 to 4, scanner sharing device 10 is configured as a device independent of scanner device 16. However, as shown in FIG. 6, scanner sharing device 10' may also be built in scanner device 16. In this case, because scanner sharing device 10' is connected with scanner device 16 inside scanner device 16, scanner device connection terminal 18 is no longer necessary. In the embodiment of FIG. 5, the parts corresponding to those of the embodiment of FIGS. 1 to 4 are denoted by the same reference numerals. The configuration and the operations of scanner sharing device 10' in scanner device 16 of the embodiment shown in FIG. 5, with the exclusion of scanner device connection terminal 18 becoming unnecessary, are fundamentally the same as those of scanner sharing device 10 shown in FIGS. 1 to 4 and will therefore not be described.

Although the scanner sharing device according to the present invention has been described based on the illustrated embodiments, it is not limited to the illustrated embodiments.

What is claimed is:

1. A scanner sharing device for enabling a plurality of computers to share one scanner device, said scanner sharing device comprising:
   a scanner device connection terminal for a scanner device to be connected thereto and transmitting and receiving signals between said scanner device and said scanner sharing device;
   a plurality of computer connection terminals for a plurality of computers to be connected thereto and transmitting and receiving signals between said plurality of computers and said scanner sharing device;
   a connection switching unit selectively connecting one of said plurality of computer connection terminals to said scanner device connection terminal;
   a switch control unit controlling the operations of said connection switching unit,
   wherein the switch control unit includes a main controller connected to one computer connection terminal of the plurality of computer connection terminals and sub controllers connected to each of remaining computer connection terminals of the plurality of computer connection terminals;
   wherein the main controller of the switch control unit receives processing request signals and processing completion signals from a computer connected to the one computer connection terminal, and the sub controllers of the switch control unit receive processing request signals and processing completion signals from computers connected to each of the remaining computer connection terminals; and
   wherein when said scanner sharing device is in an automatic switching mode, if said switch control unit receives processing request signals from said plurality of computers through said computer connection terminals, said switch control unit connects the computer connection terminal, associated with one computer emitting said processing request signal, with said scanner device connection terminal by said connection switching unit successively in the order in which said switch control unit received the processing request signals, and maintains the connection between said computer connection terminal associated with said one computer and said scanner device connection terminal until said switch control unit receives a processing completion signal from said one computer through said computer connection terminal.

2. The scanner sharing device according to claim 1, further comprising a mode changeover switch for switching between a manual switching mode which enables manual switching of said computer connection terminal to be connected with said scanner device connection terminal and an automatic switching mode, and at least one computer selection button for manually selecting one computer connection terminal to be connected with said scanner device connection terminal from said plurality of computer connection terminals when said scanner sharing device is in the manual switching mode.

3. The scanner sharing device according to claim 2, further comprising a mode display unit indicating whether the automatic switching mode or the manual switching mode is selected.

4. The scanner sharing device according to claim 2, wherein said mode changeover switch is a slide cover movable between a first position for selecting the automatic switching mode and a second position for selecting the manual switching mode, said slide cover covering said at least one computer selection button when said slide cover is moved to the first position and exposing said at least one computer selection button outside said slide cover when said slide cover is moved to the second position.

5. The scanner sharing device according to claim 3, wherein said mode changeover switch is a slide cover movable between a first position for selecting the automatic switching mode and a second position for selecting the manual switching mode, said slide cover covering said at least one computer selection button when said slide cover is moved to the first position and exposing said at least one computer selection button outside said slide cover when said slide cover is moved to the second position.

6. The scanner sharing device according to claim 2, wherein said at least one computer selection button comprises a plurality of computer selection buttons associated with said plurality of computers, respectively, said plurality of computer selection buttons configured so that one of said plurality of computer selection buttons lights up when said one is selected.

7. The scanner sharing device according to claim 3, wherein said at least one computer selection button comprises a plurality of computer selection buttons associated with said plurality of computers, respectively, said plurality of computer selection buttons configured so that one of said plurality of computer selection buttons lights up when said one is selected.

8. The scanner sharing device according to claim 4, wherein said at least one computer selection button comprises a plurality of computer selection buttons associated with said plurality of computers, respectively, said plurality of computer selection buttons configured so that one of said plurality of computer selection buttons lights up when said one is selected.

9. The scanner sharing device according to claim 5, wherein said at least one computer selection button comprises a plurality of computer selection buttons associated with said plurality of computers, respectively, said plurality of computer selection buttons configured so that one of said plurality of computer selection buttons lights up when said one is selected.

10. The scanner sharing device according to claim 1, wherein said scanner sharing device is built in said scanner device.

11. The scanner sharing device according to claim 2, wherein said scanner sharing device is built in said scanner device.

12. The scanner sharing device according to claim 3, wherein said scanner sharing device is built in said scanner device.

13. The scanner sharing device according to claim 4, wherein said scanner sharing device is built in said scanner device.

14. The scanner sharing device according to claim 5, wherein said scanner sharing device is built in said scanner device.

15. The scanner sharing device according to claim 6, wherein said scanner sharing device is built in said scanner device.

16. The scanner sharing device according to claim 7, wherein said scanner sharing device is built in said scanner device.

17. The scanner sharing device according to claim 8, wherein said scanner sharing device is built in said scanner device.

18. The scanner sharing device according to claim 9, wherein said scanner sharing device is built in said scanner device.

* * * * *